United States Patent
Cowburn et al.

(10) Patent No.: US 11,960,651 B2
(45) Date of Patent: Apr. 16, 2024

(54) GESTURE-BASED SHARED AR SESSION CREATION

(71) Applicant: Snap Inc., Santa Monica, CA (US)

(72) Inventors: Piers George Cowburn, London (GB); David Li, London (GB); Isac Andreas Müller Sandvik, London (GB); Qi Pan, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/983,693

(22) Filed: Aug. 3, 2020

(65) Prior Publication Data

US 2021/0303075 A1    Sep. 30, 2021

Related U.S. Application Data

(60) Provisional application No. 63/002,099, filed on Mar. 30, 2020.

(51) Int. Cl.
*G06F 3/01* (2006.01)
*G06F 3/04815* (2022.01)
(Continued)

(52) U.S. Cl.
CPC .......... *G06F 3/017* (2013.01); *G06F 3/04815* (2013.01); *G06T 19/006* (2013.01); *H04L 51/04* (2013.01); *H04L 67/131* (2022.05)

(58) Field of Classification Search
CPC .... G06F 3/0481; G06F 3/017; G06F 3/04815; G06F 3/011; G06F 3/013; G06T 19/006;
(Continued)

(56) References Cited

U.S. PATENT DOCUMENTS 7,119,819 B1 * 10/2006 Robertson ........... G06F 3/04815
                                                    715/848
7,542,040 B2 *  6/2009 Templeman ............ G06T 13/40
                                                    345/474
(Continued)

FOREIGN PATENT DOCUMENTS

CN       103049761 B    8/2016
CN       115552357 A   12/2022
(Continued)

OTHER PUBLICATIONS

"International Application Serial No. PCT/US2021/070340, International Search Report dated Jul. 12, 2021", 5 pgs.
(Continued)

*Primary Examiner* — Nicholas Augustine
(74) *Attorney, Agent, or Firm* — Schwegman Lundberg & Woessner, P.A.

(57) ABSTRACT

Method of creating shared AR session based on a gesture starts with server receiving observed motion data from first device associated with first user. First device generating observed motion data based on an analysis of data stream comprising images of second user performing a gesture. Second user being associated with second device. Server receiving from second device captured motion data that corresponds to the gesture. Captured motion data being recorded by a sensor included in second device. Server determines whether there is a match between observed motion data from first device and captured motion data from second device. In response to determining that there is the match, server generates shared AR session between first device and second device and causes shared AR session to be displayed by first device and second device. Other embodiments are described herein.

18 Claims, 11 Drawing Sheets

(51) Int. Cl.
*G06T 19/00* (2011.01)
*H04L 51/04* (2022.01)
*H04L 67/131* (2022.01)
*G06F 3/048* (2013.01)

(58) Field of Classification Search
CPC ....... H04L 51/04; H04L 67/38; H04L 51/046; H04L 51/10; H04L 51/52
See application file for complete search history.

(56) References Cited

U.S. PATENT DOCUMENTS

| | | | |
|---|---|---|---|
| 7,971,156 B2 | 6/2011 | Albertson et al. | |
| 7,996,793 B2 | 8/2011 | Latta et al. | |
| 8,487,938 B2 | 7/2013 | Latta et al. | |
| 8,856,691 B2 | 10/2014 | Geisner et al. | |
| 9,225,897 B1 | 12/2015 | Sehn et al. | |
| 9,230,160 B1 | 1/2016 | Kanter | |
| 9,244,533 B2 * | 1/2016 | Friend | G09B 21/009 |
| 9,276,886 B1 | 3/2016 | Samaranayake | |
| 9,696,795 B2 * | 7/2017 | Marcolina | G06T 17/10 |
| 9,705,831 B2 | 7/2017 | Spiegel | |
| 9,742,713 B2 | 8/2017 | Spiegel et al. | |
| 9,996,797 B1 * | 6/2018 | Holz | G06F 3/04842 |
| 10,102,423 B2 | 10/2018 | Shaburov et al. | |
| 10,284,508 B1 | 5/2019 | Allen et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,516,853 B1 * | 12/2019 | Gibson | H04N 7/157 |
| 10,579,869 B1 | 3/2020 | Xiong et al. | |
| 10,614,855 B2 | 4/2020 | Huang | |
| 10,748,347 B1 | 8/2020 | Li et al. | |
| 10,958,608 B1 | 3/2021 | Allen et al. | |
| 10,962,809 B1 | 3/2021 | Castañeda | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 11,307,747 B2 | 4/2022 | Dancie et al. | |
| 11,531,402 B1 | 12/2022 | Stolzenberg | |
| 11,546,505 B2 | 1/2023 | Canberk | |
| 2001/0002126 A1 * | 5/2001 | Rosenberg | A63F 13/285 345/156 |
| 2001/0030658 A1 * | 10/2001 | Rosenberg | G06F 3/011 715/701 |
| 2001/0044858 A1 * | 11/2001 | Rekimoto | G06F 3/011 710/1 |
| 2002/0021283 A1 * | 2/2002 | Rosenberg | G06F 3/016 345/156 |
| 2003/0016207 A1 * | 1/2003 | Tremblay | G06F 3/0484 345/156 |
| 2006/0287025 A1 * | 12/2006 | French | A63F 13/843 463/4 |
| 2007/0132785 A1 * | 6/2007 | Ebersole, Jr. | A63F 13/213 345/633 |
| 2009/0012788 A1 | 1/2009 | Gilbert et al. | |
| 2010/0045619 A1 * | 2/2010 | Birnbaum | G06F 3/04845 345/173 |
| 2011/0197263 A1 | 8/2011 | Stinson, III | |
| 2011/0301934 A1 | 12/2011 | Tardif | |
| 2012/0249741 A1 * | 10/2012 | Maciocci | G06T 19/006 348/51 |
| 2013/0159939 A1 | 6/2013 | Krishnamurthi | |
| 2014/0082526 A1 * | 3/2014 | Park | H04L 65/403 715/757 |
| 2014/0171036 A1 | 6/2014 | Simmons | |
| 2014/0282105 A1 * | 9/2014 | Nordstrom | G06F 3/016 715/753 |
| 2015/0120293 A1 | 4/2015 | Wohlert et al. | |
| 2015/0370320 A1 | 12/2015 | Connor | |
| 2016/0300387 A1 | 10/2016 | Ziman | |
| 2017/0123487 A1 | 5/2017 | Hazra et al. | |
| 2017/0185261 A1 * | 6/2017 | Perez | G06F 3/04845 |
| 2017/0277684 A1 | 9/2017 | Dharmarajan Mary | |
| 2017/0277685 A1 | 9/2017 | Takumi | |
| 2017/0351910 A1 | 12/2017 | Elwazer et al. | |
| 2018/0107341 A1 | 4/2018 | Aurongzeb et al. | |
| 2018/0131907 A1 * | 5/2018 | Schmirler | H04N 23/698 |
| 2018/0158370 A1 | 6/2018 | Pryor | |
| 2018/0357472 A1 * | 12/2018 | Dreessen | G06V 20/49 |
| 2018/0357826 A1 | 12/2018 | Ross et al. | |
| 2019/0065027 A1 * | 2/2019 | Hauenstein | G06F 3/04815 |
| 2019/0087015 A1 * | 3/2019 | Lam | A63F 13/213 |
| 2020/0004401 A1 * | 1/2020 | Hwang | G06F 3/04815 |
| 2020/0005026 A1 * | 1/2020 | Andersen | A63F 13/428 |
| 2020/0005539 A1 * | 1/2020 | Hwang | G06F 3/167 |
| 2020/0110928 A1 * | 4/2020 | Al Jazaery | G05B 19/042 |
| 2020/0117267 A1 * | 4/2020 | Gibson | G06F 3/011 |
| 2020/0117270 A1 * | 4/2020 | Gibson | G06F 3/011 |
| 2021/0008413 A1 * | 1/2021 | Asikainen | G06F 3/0304 |
| 2021/0011612 A1 | 1/2021 | Dancie et al. | |
| 2021/0041951 A1 * | 2/2021 | Gibson | G06T 7/74 |
| 2021/0074016 A1 | 3/2021 | Li et al. | |
| 2021/0166732 A1 | 6/2021 | Shaburova et al. | |
| 2021/0174034 A1 | 6/2021 | Retek et al. | |
| 2021/0241529 A1 | 8/2021 | Cowburn et al. | |
| 2021/0303077 A1 | 9/2021 | Anvaripour et al. | |
| 2021/0303140 A1 | 9/2021 | Mourkogiannis | |
| 2021/0382564 A1 | 12/2021 | Blachly et al. | |
| 2021/0397000 A1 | 12/2021 | Rodriguez, II | |
| 2021/0405761 A1 | 12/2021 | Canberk | |
| 2022/0188539 A1 | 6/2022 | Chan et al. | |
| 2022/0206588 A1 | 6/2022 | Canberk et al. | |
| 2022/0300730 A1 | 9/2022 | Eirinberg et al. | |
| 2022/0300731 A1 | 9/2022 | Eirinberg et al. | |
| 2022/0326781 A1 | 10/2022 | Hwang et al. | |
| 2022/0334649 A1 | 10/2022 | Hwang et al. | |

FOREIGN PATENT DOCUMENTS

| | | |
|---|---|---|
| EP | 3707693 A1 | 9/2020 |
| KR | 20220158824 A | 12/2022 |
| WO | WO-2016168591 A1 | 10/2016 |
| WO | WO-2019094618 A1 | 5/2019 |
| WO | 2019212902 | 11/2019 |
| WO | 2020047117 | 3/2020 |
| WO | WO-2021203133 A1 | 10/2021 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"International Application Serial No. PCT/US2021/070340, Written Opinion dated Jul. 12, 2021", 6 pgs.

"International Application Serial No. PCT/US2021/070340, International Preliminary Report on Patentability dated Oct. 13, 2022", 8 pgs.

* cited by examiner

GESTURE-BASED SHARED AR SESSION CREATION

CLAIM OF PRIORITY

This application claims the benefit of priority to U.S. Provisional Application Ser. No. 63/002,099, filed on Mar. 30, 2020, which is incorporated herein by reference in its entirety.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. The AR system aims to generate and present virtual objects that interact realistically with a real-world environment and with each other. Examples of AR applications can include single or multiple player video games, instant messaging systems, etc.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
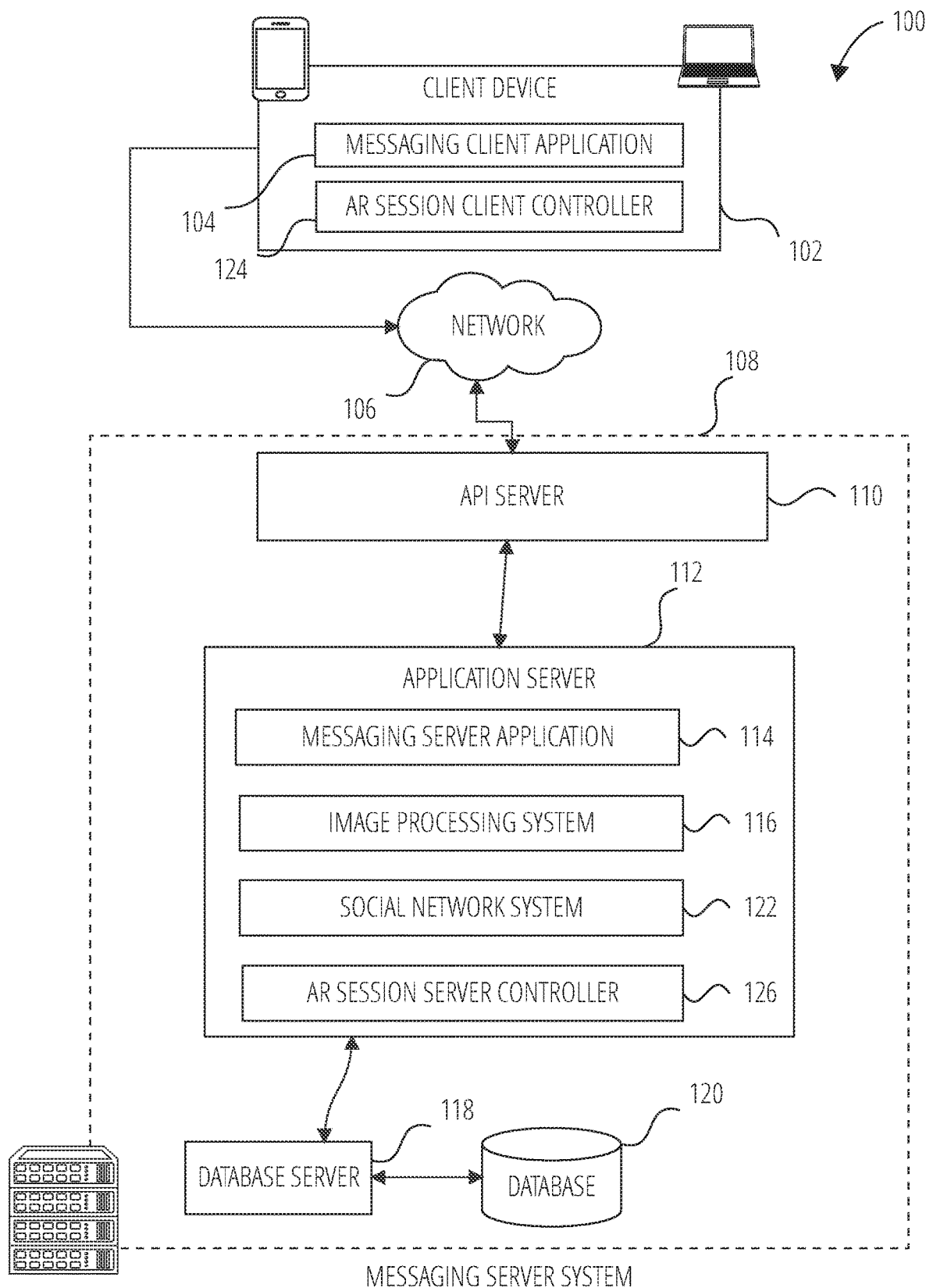
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of an Augmented Reality (AR) creation software and system by establishing a shared AR session based on a gesture. In one embodiment, the system hosts a shared AR session that is a session in which a plurality of users via client devices can participate. The shared AR session can be for example an AR car racing game in which each user is controlling a different car. Each of the users are looking at the same shared AR scene being displayed on the client devices at the same time. The experience can be synchronized and shared between all the users. In this example, the actions of one user in the shared AR session can be synchronized and broadcast to all the other users. Accordingly, the shared AR session is a shared virtual space but in AR.

One first challenge of generating the shared AR session is to establish which client devices are participants. For example, in many scenarios, in order to enter a shared. AR session, the participants via their client devices must be invited in some way.

In one embodiment, the system implements a method of creating a shared AR session based on a gesture. Specifically, the system can use using skeleton tracking to determine the participants in the shared AR session. In this embodiment, a first client device associated with a first user captures images or a video of a second user performing a gesture. The second user is associated with a second client device. The first client device generates an observed motion data based on the gesture in the images or video. A sensor included in the second device captures the second user's movements which include the second user's gesture and the second client device generates the captured motion data based on the sensor outputs.

In one embodiment, the messaging server system receives an observed motion data from a first device and a captured motion data from a second device. The messaging server system determines whether the first and the second device are to be included as participants in a shared AR session based on whether there is a match between the observed motion data and the captured motion data. In another embodiment, the second client device transmits the captured motion data to the first client device and the first client device determines whether there is a match between the observed motion data and the captured motion data. When there is a match, the first client device transmits a request to the messaging server system to create a shared AR session for the first and the second client devices.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104 and an AR session client controller 124. Each messaging client application 104 is communicatively coupled to other instances of the messaging client application 104 and a messaging server system 108 via a network 106 (e.g., the Internet). Each AR session client controller 124 is communicatively coupled to other instances of the AR session client controller 124 and an AR session server controller 126 in the messaging server system 108 via the network 106.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

The AR session client controller 124 is able to communicate and exchange data with another AR session client controller 124 and with the AR session server controller 126 via the network 106. The data exchanged between the plurality of AR session client controllers 124, and between the AR session client controller 124 and the AR session server controller 126 can include an observed motion data, a captured motion data, a request to create a shared AR session, an identification of a user in a data stream (images or video), a session identifier that identifies the shared AR session, the transformation between a first device and a second device (e.g., plurality of client devices 102 include the first and a second device), a common coordinate frame, functions (e.g., commands to invoke functions) as well as other payload data (e.g., text, audio, video or other multimedia data).

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other Processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
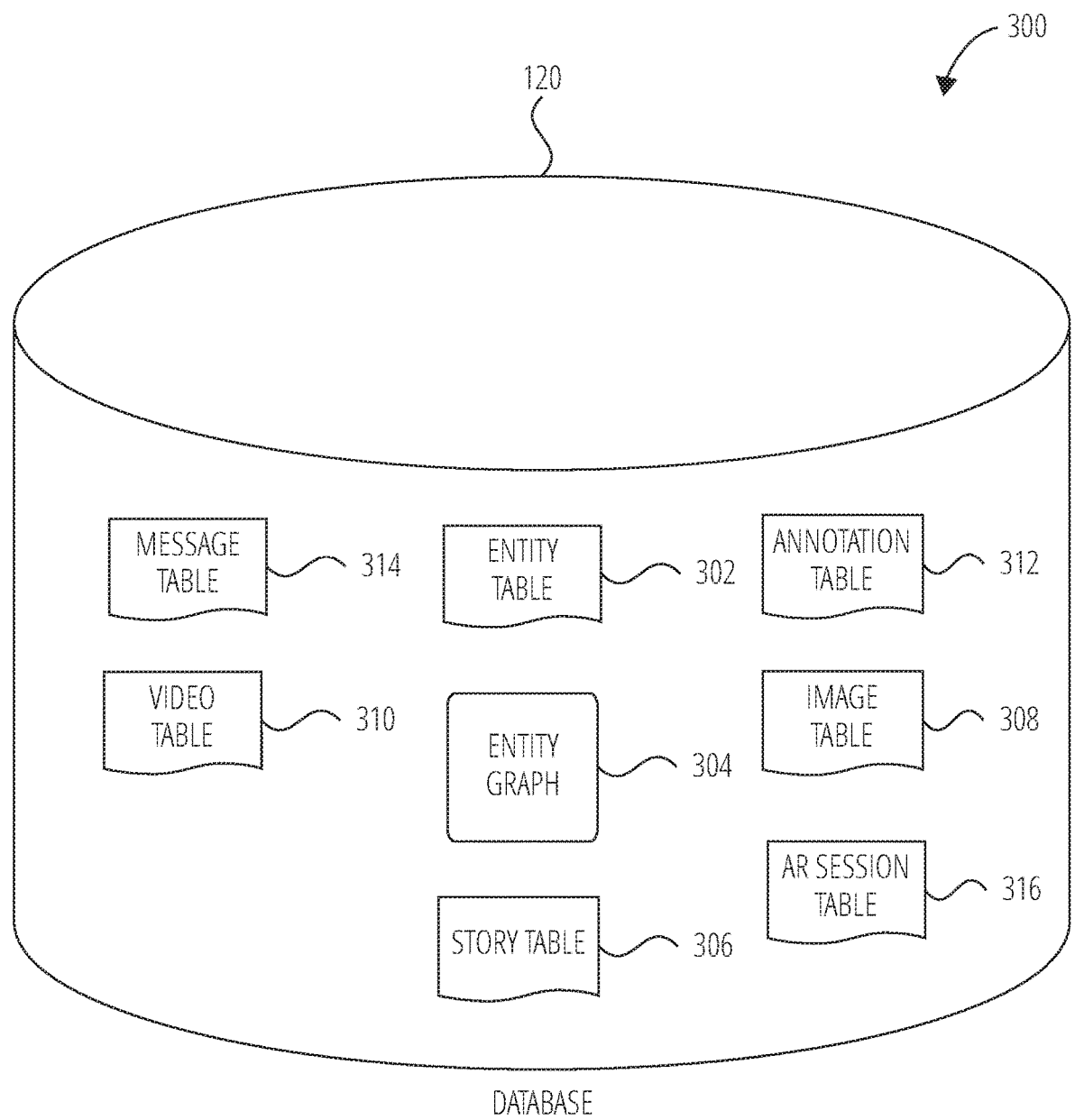
FIG. 3 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 also includes the AR session server controller 126 that can communicate with the AR session client controller 124 in the client device 102 to establish individual or shared AR sessions. The AR session server controller 126 can also be coupled to the messaging server application 114 to establish an electronic group communication session (e.g., group chat, instant messaging) for the client devices in a shared AR session. The electronic group communication session can be associated with a session identifier provided by the client devices 102 to gain access to the electronic group communication session and to the shared AR session. In one embodiment, the client devices first gain access to the electronic group communication session and then obtain the session identifier in the electronic group communication session that allows the client devices to access to the shared AR session. In some embodiments, the client devices 102 are able to access the shared AR session without aid or communication with the AR session server controller 126 in the application server 112.

The application server 112 is communicatively coupled to a database server 118, which facilitates access to a database 120 in which is stored data associated with messages processed by the messaging server application 114.

Figure 2:
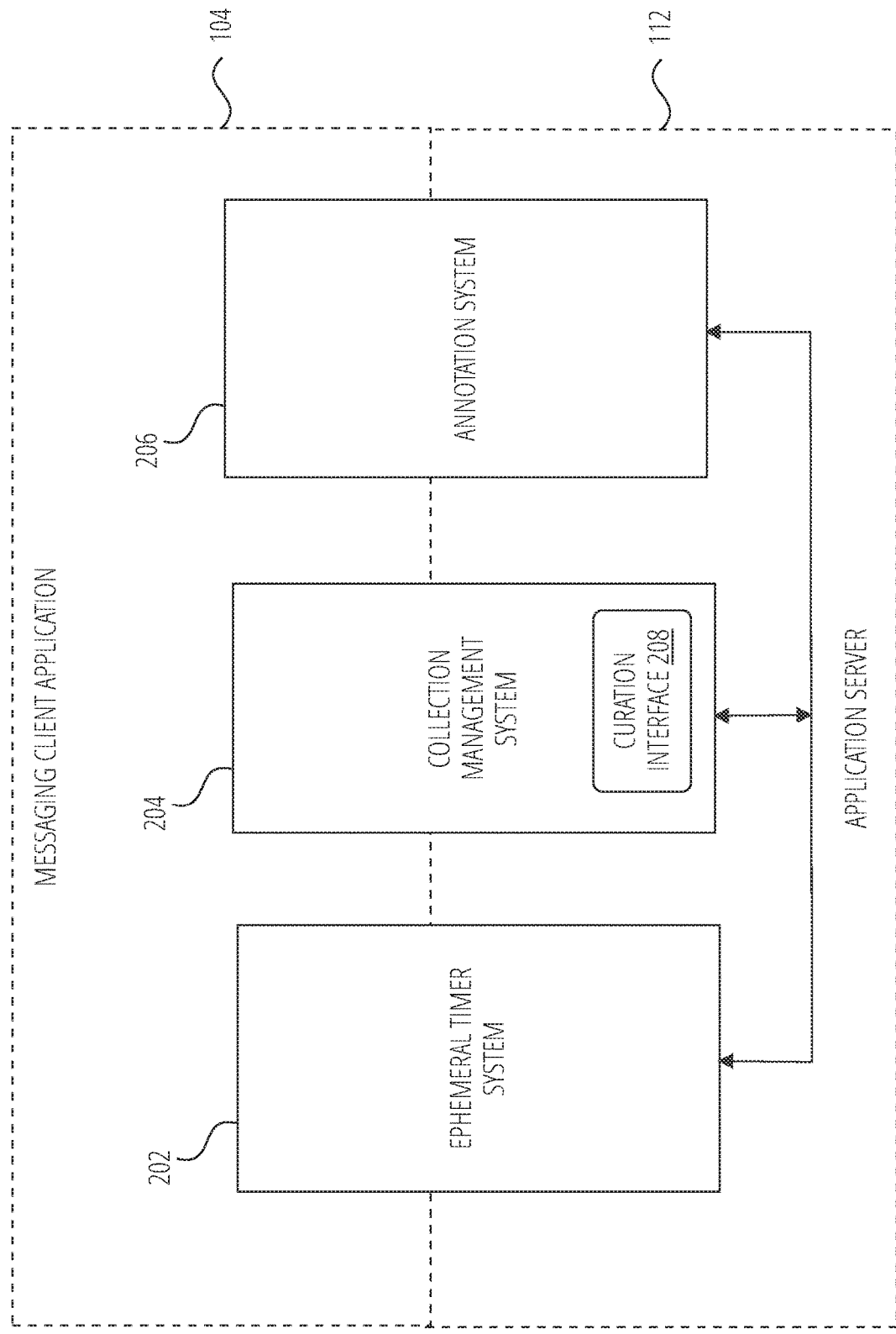
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral tinier system 202 is responsible for enforcing the temporary access to content permitted by the messaging client application 104 and the messaging server application 114. To this end, the ephemeral tinier system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312. are associated with and applied to videos (for which data is stored in a video table 310) and/or images (for which data is stored in an image table 308). Filters, in one example, are overlays that are displayed as overlaid on an image or video during presentation to a recipient user, Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content items (e.g., corresponding to applying Lenses or augmented reality experiences) An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data, Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 can also store data pertaining to individual and shared AR sessions in the AR session table 316. The data in the AR session table 316 can include data communicated between the AR session client controller 124 and another AR session client controller 124, and data communicated between the AR session client controller 124 and the AR session server controller 126, Data can include the observed motion data, the captured motion data, the identification of the user in a data stream (images or video), data used to establish the common coordinate frame of the shared AR scene, the transformation between the devices, the session identifier, etc.

Figure 4:
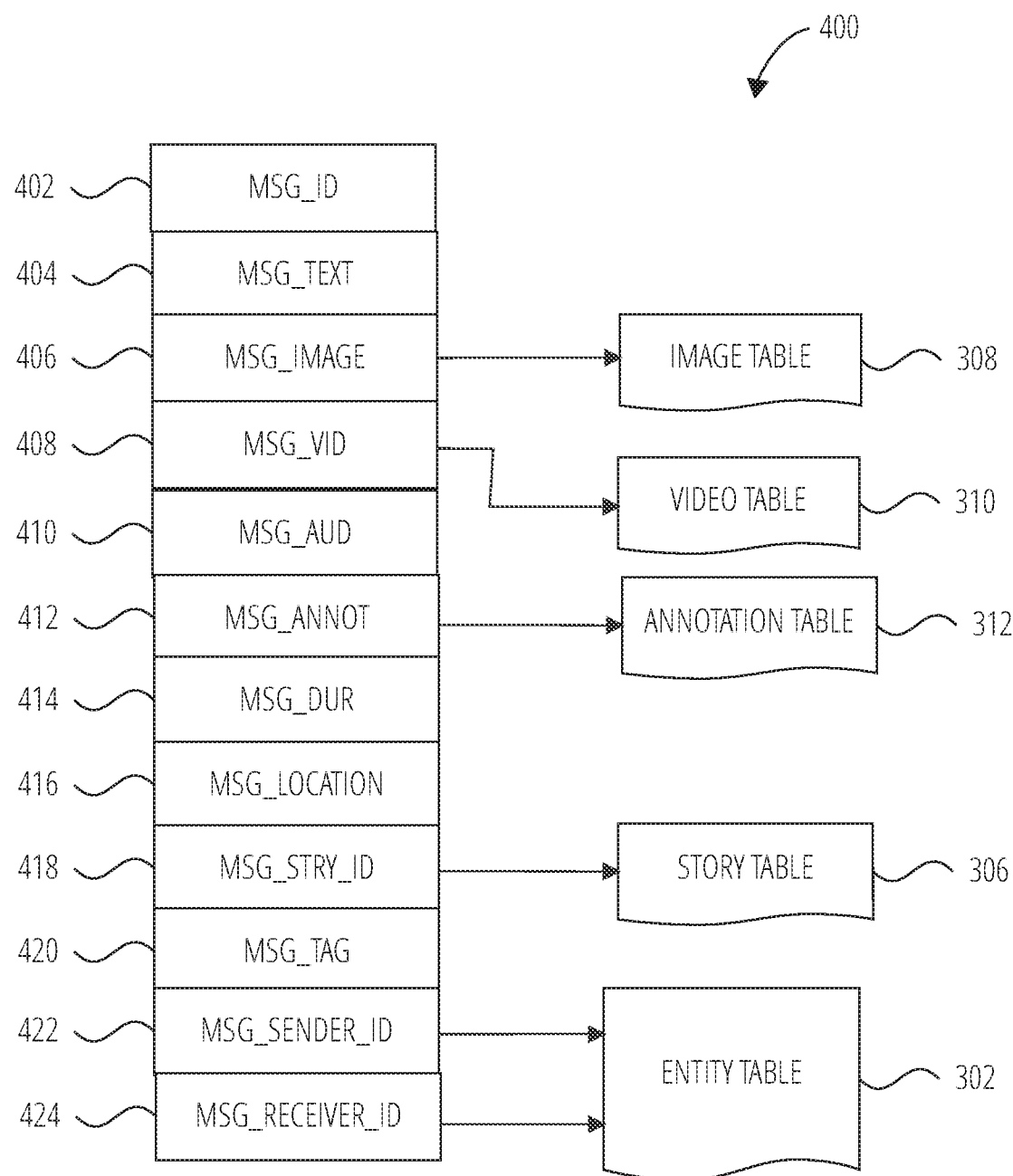
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Although the following flowcharts can describe the operations as a sequential process, many of the operations can be performed in parallel or concurrently. In addition, the order of the operations may be re-arranged. A process is terminated when its operations are completed. A process may correspond to a method, a procedure, etc. The steps of methods may be performed in whole or in part, may be performed in conjunction with some or all of the steps in other methods, and may be performed by any number of different systems, such as the systems described in FIG. 1, and/or FIG. 10, or any portion thereof, such as a processor included in any of the systems.

Figure 5:
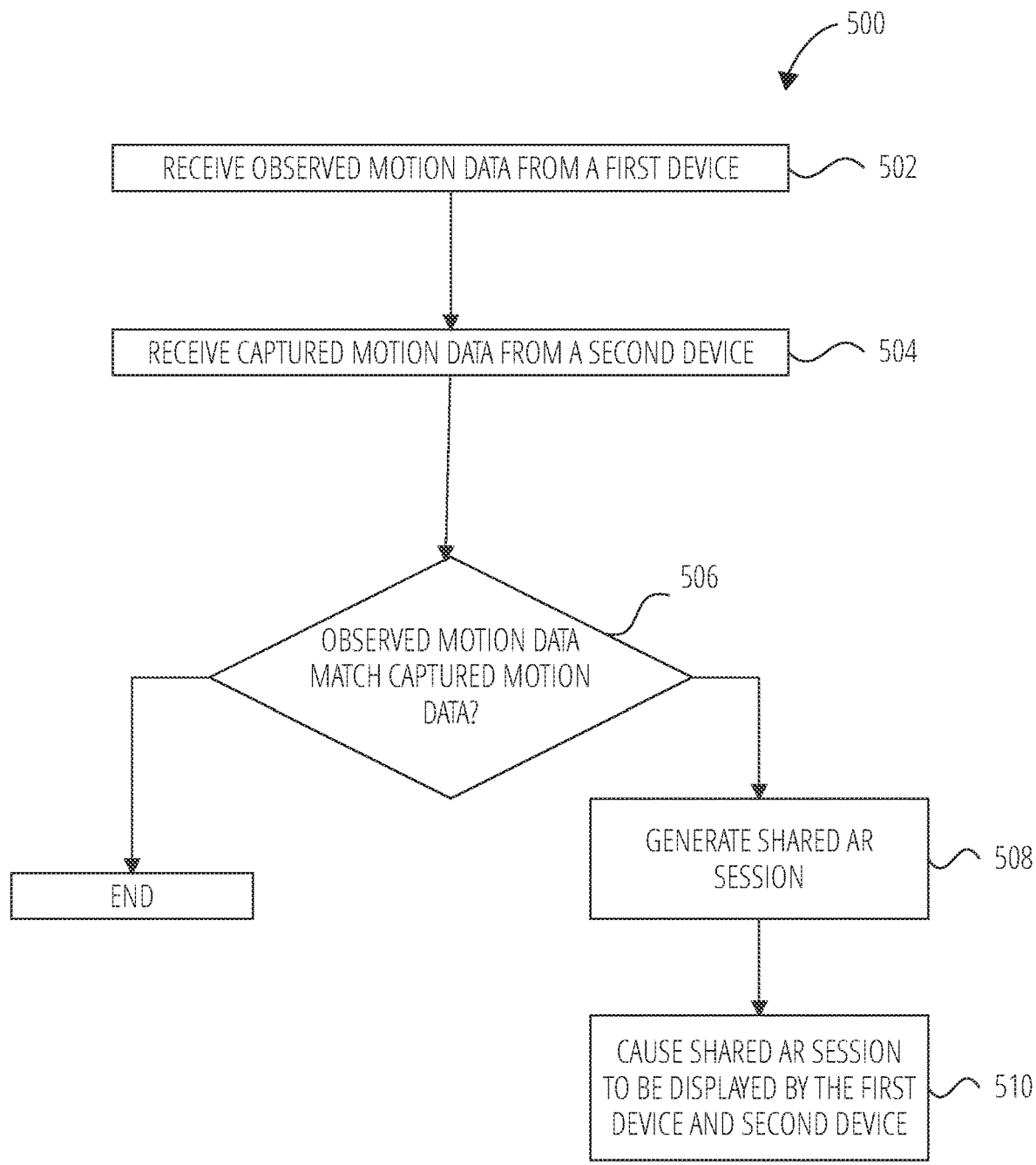
FIG. 5 is a flowchart for a process 500 of creating a shared AR session based on gesture, in accordance with one embodiment.

FIG. 5 is a flowchart of a process 500 for creating a shared AR session based on a gesture, in accordance with some example embodiments. In one embodiment, the process 500 can be performed by the AR session server controller 126 in the messaging server system 108.

Figure 8:
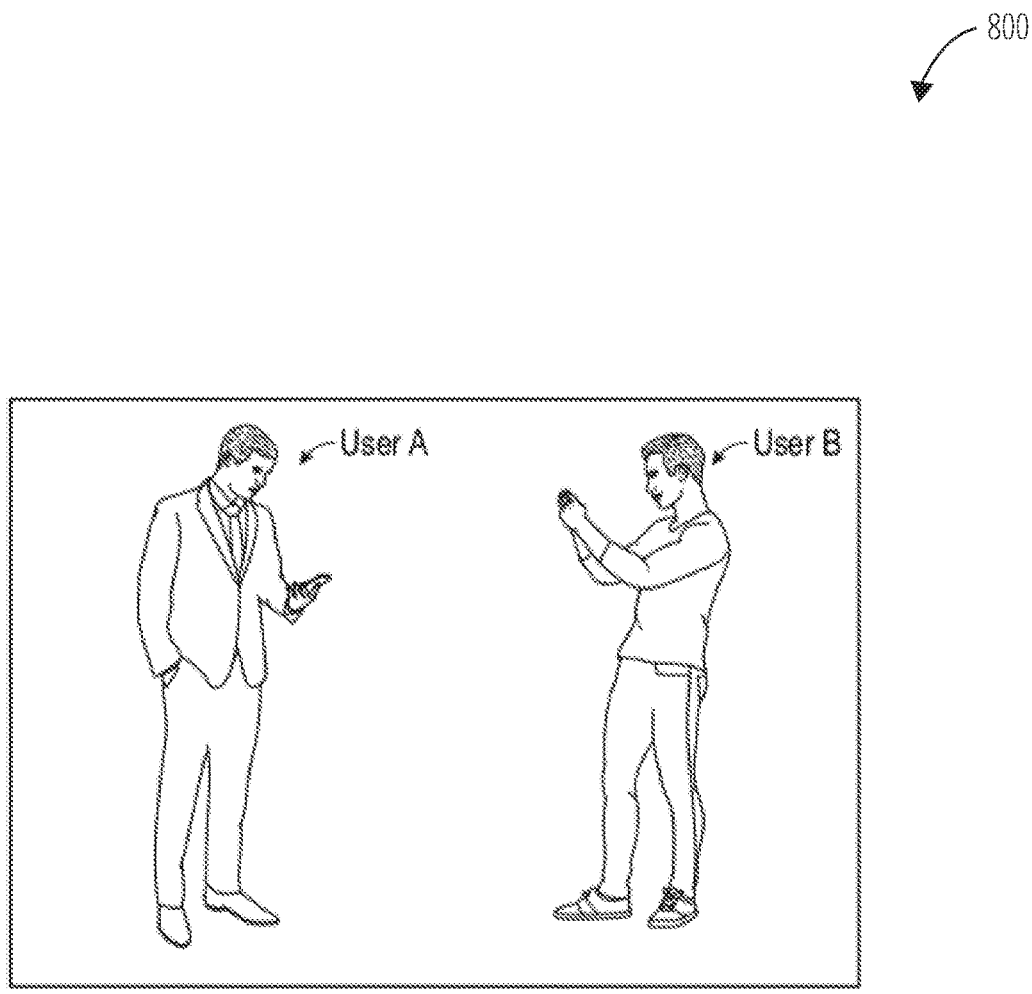
FIG. 8 illustrates an example 800 of a first user (user B) using the first client device 102 to capture images or a video of a second user (user A) in accordance with one embodiment.

At operation 502, the AR session server controller 126 receives observed motion data from a first client device 102 associated with a first user. In one embodiment, the first client device 102 generates the observed motion data based on an analysis of a data stream comprising images of a second user associated with a second client device 102 performing a gesture, in some embodiments, the gesture is an intentional movement performed by the second user such as a wave, a dance, etc. In other embodiments, the gesture is a natural movement to the second user such as the second user's walking gait. The data stream can be a video of the second user performing the gesture. The first client device 102 can capture the video using a camera included in the first client device 102, as shown in FIG. 8, for example. In one embodiment, the first client device 102 generates the observed motion data based on the analysis of the data stream by identifying positions of at least one body part of the second user and by analyzing a motion of the at least one body part. In one embodiment, the motion of the at least one body part is during the gesture. In one embodiment, the observed motion data is a summary of the analysis of the motion of the at least one body part. The at least one body part can be, for example, the second user's arm or hand. In one embodiment, the first client device 102 can use skeleton tracking to identify the positions of the second user's arm or hand.

At operation 504, the AR session server controller 126 receives from the second client device 102 a captured motion data that corresponds to the gesture. A sensor included in the second client device 102 can record the captured motion data. In one embodiment, the sensor is an inertial sensor such as an accelerometer or a gyroscope that captures the position, movement and orientation of the second client device 102.

At operation 506, the AR session server controller 126 determines whether there is a match between the observed motion data from the first client device 102 and the captured motion data from the second client device 102. In one embodiment, the AR session server controller 126 determines there is a match when the observed motion data and the captured motion data describe the same gesture being performed by the second user within a predetermined error threshold.

When the AR session server controller 126 determines that there is not match, no further operation is performed by the AR session server controller 126. When the AR session server controller 126 determines that there is a match, at operation 508, the AR session server controller 126 generates shared AR session between the first client device 102 and the second client device 102. In one embodiment, the shared AR session comprises a real-time messaging session such as an electronic group communication session.

At operation 510, the AR session server controller 126 causes the shared AR session to be displayed by the first client device 102 and second client device 102. The AR session server controller 126 can generate a session identifier for the shared AR session that is transmitted to both the first client device 102 and the second client device 102. The electronic group communication session can be associated with a session identifier provided by the client devices 102 to gain access to the electronic group communication session and to the shared AR session. The first client device 102 can use the session identifier to establish a communication connection or coupling with a real-time messaging service. The real-time messaging service can be the electronic group communication session that is established by the AR session server controller 126.

In one embodiment, the data stream includes images of a third user being associated with a third device. In this embodiment, when the AR session server controller 126 determines that there is a match at operation 506, the AR session server controller 126 transmits to the first client device 102 a signal indicating that the match was established. The signal causes the first client device 102 to identify the second user in the data stream as being associated with the second device.

In one embodiment, when the first client device 102 and the second client device 102 are already in a shared AR session, the operations 502, 504, and 506 in process 500 can be performed by the AR session server controller 126 to identify the second user in the data stream to the first client device 102. For example, in one embodiment, the client devices first gain access to the electronic group communication session and then obtain the session identifier in the electronic group communication session that allows the client devices to access to the shared AR session. In some embodiments, the client devices 102 are able to access the shared AR session without aid or communication with the AR session server controller 126 in the application server 112. In this embodiment, at operation 506, when the AR session server controller 126 determines that there is a match, the AR session server controller 126 transmits to the first client device 102 a signal that causes the first client device 102 to identify the second user in the data stream as being associated with the second device.

By identifying the second user in the data stream, the first client device 102 is able to, for example, generate the visual or sound effects to be applied to the image of the second user on the first client device 102 in the shared AR session (e.g., costumes to be worn by the second user, effects to be applied to the second user's face, voice sound effects to be applied to the second user, etc.).

Figure 6:
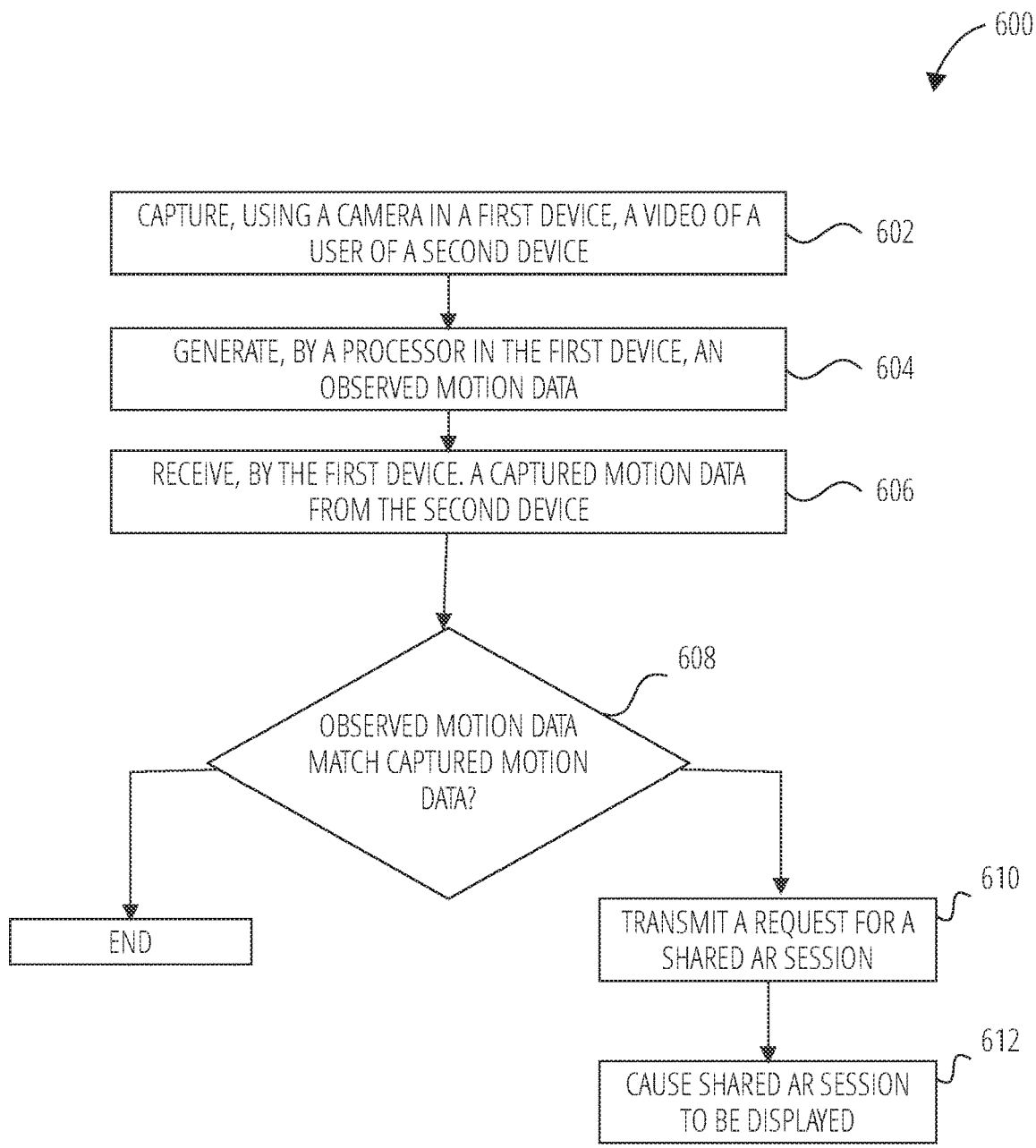
FIG. 6 illustrates a process 600 of creating a shared AR session based on gesture, in accordance with one embodiment.

FIG. 6 illustrates a process 600 of creating a shared AR session based on gesture, in accordance with one embodiment. In one embodiment, the process 600 can be performed by the AR session client controller 124 included in the first client device 102.

At operation 602, the AR session client controller 124 of the first client device 102 captures, using a camera included in the first client device 102, a video of a user of a second client device 102 performing a gesture. As shown in FIG. 8, the first user (user B) captures using the camera in the first client device 102 images or a video of the second user (user A) of the second client device 102.

The AR session client controller 124 of the first client device 102 then generates, at operation 604, an observed motion data based on an analysis of the video of the user of the second client device 102.

At operation 606, the AR session client controller 124 of the first client device 102 receives from the second client device 102 a captured motion data that corresponds to the gesture. A sensor included in the second client device 102 records the captured motion data. In one embodiment, the sensor is an inertial sensor such as an accelerometer or a gyroscope that captures the position, movement and orientation of the second client device 102.

The AR session client controller 124 of the first client device 102, at operation 608, determines whether the observed motion data matches the captured motion data. In one embodiment, the AR session client controller 124 determines there is a match when the observed motion data and the captured motion data describe the same gesture being performed by the second user within a predetermined error threshold.

When the AR session client controller 124 determines that there is no match at operation 608, the AR session client controller 124 performs no further actions.

When the AR session client controller 124 determines that there is a match at operation 608, at operation 610, the AR session client controller 124 of the first client device 102 transmits a request to the AR session server controller 126 in the messaging server system 108 for a shared AR session including the first client device 102 and the second client device 102. In one embodiment, the shared AR session comprises a real-time messaging session such as an electronic group communication session. In response to the request, the AR session server controller 126 can generate a session identifier for the shared AR session that is transmitted to both the first client device 102 and the second client device 102.

At operation 612, the AR session client controller 124 of the first client device 102 causes the shared AR session to be displayed. In one embodiment, the shared AR session is displayed on the display device included in the first client device 102. In one embodiment, the AR session client controller 124 of the first client device 102 receives the session identifier from the AR session server controller 126. The electronic group communication session can be associated with a session identifier provided by the client devices 102 to gain access to the electronic group communication session and to the shared AR session. The first client device 102 device can use the session identifier to establish a communication connection or coupling with a real-time messaging service. The real-time messaging service can be the electronic group communication session that is established by the AR session server controller 126.

When a shared AR session is already established between the first client device 102 and the second client device 102, in one embodiment, the AR session client controller 124 can identify the user of the second client device 102 in the video as being associated with the second client device 102 when the AR session client controller 124 determines that there is a match at operation 608.

By identifying the second user in the data stream, the first client device 102 is able to, for example, generate the visual or sound effects to be applied to the image of the second user on the first client device 102 in the shared AR session (e.g., costumes to be worn by the second user, effects to be applied to the second user's face, voice sound effects to be applied to the second user, etc.).

Figure 7:
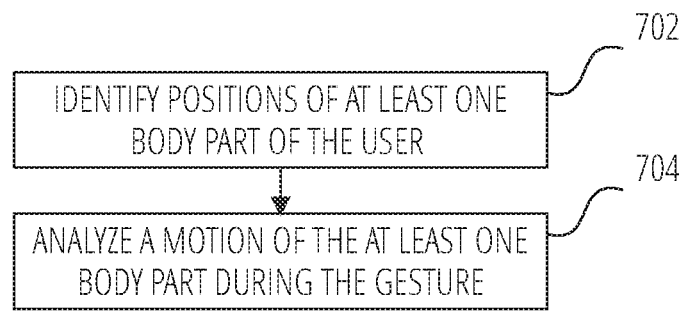
FIG. 7 illustrates details of the operation 604 in FIG. 6, in accordance with one embodiment.

FIG. 7 illustrates details of the operation 604 in FIG. 6, in accordance with one embodiment. To generate the observed motion data in operation 604, at operation 702, the AR session client controller 124 of the first client device 102 identifies positions of at least one body part of the user. At operation 704, the AR session client controller 124 of the first client device 102 analyzes a motion of the at least one body part during the gesture, In one embodiment, the observed motion data is a summary of the analysis of the motion of the at least one body part, The at least one body part can be, for example, the second user's arm or hand. In one embodiment, the first client device 102 can use skeleton tracking to identify the positions of the second user's arm or hand.

FIG. 8 illustrates an example 800 of a first user (user B) using the first client device 102 to capture images or a video of a second user (user A) in accordance with one embodiment. As shown in FIG. 8, the second user (user A) can be associated with a second client device 102. For example, the second user (user A) is holding the second client device 102 in FIG. 8.

Figure 9:
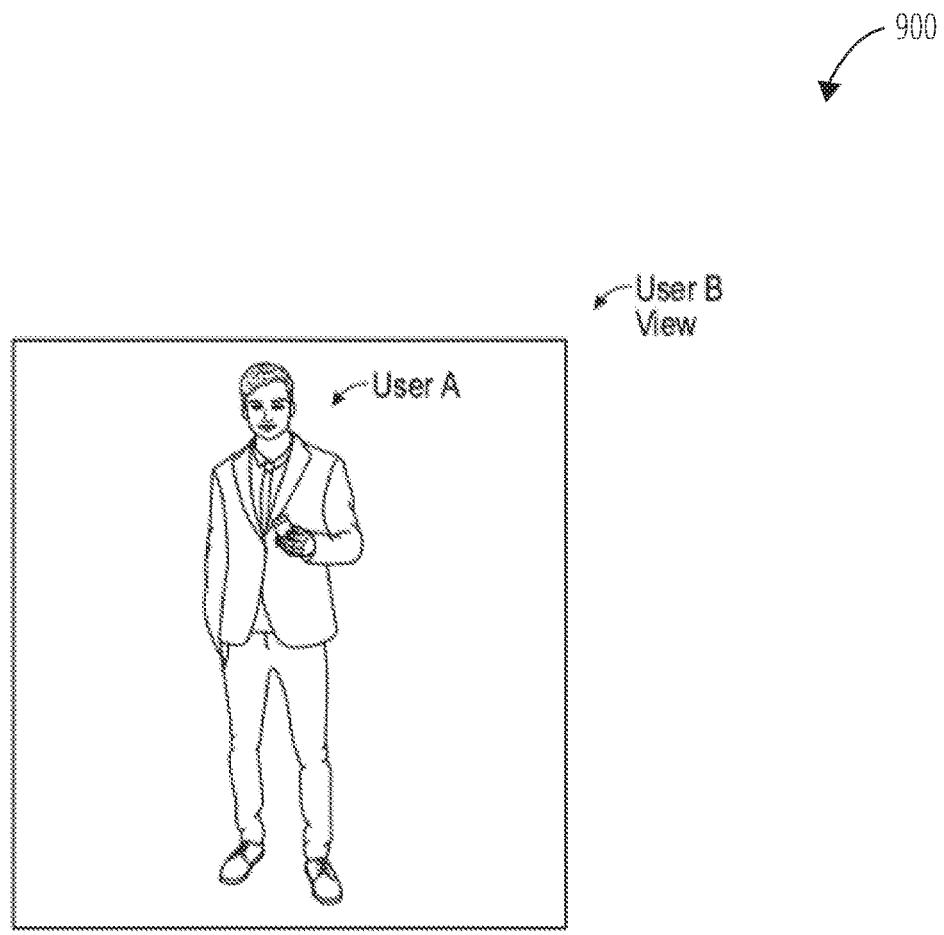
FIG. 9 illustrates an example 900 of an image captured using the camera included in the first client device 102 in accordance with one embodiment.

FIG. 9 illustrates an example 900 of an image captured using the camera included in the first client device 102 in accordance with one embodiment. The image in FIG. 9 illustrates the second user (user A) within the field of view of the camera of the first client device 102. The second user (user A) can be captured performing a gesture that is used to generate the observed motion data by the first client device 102.

Figure 10:
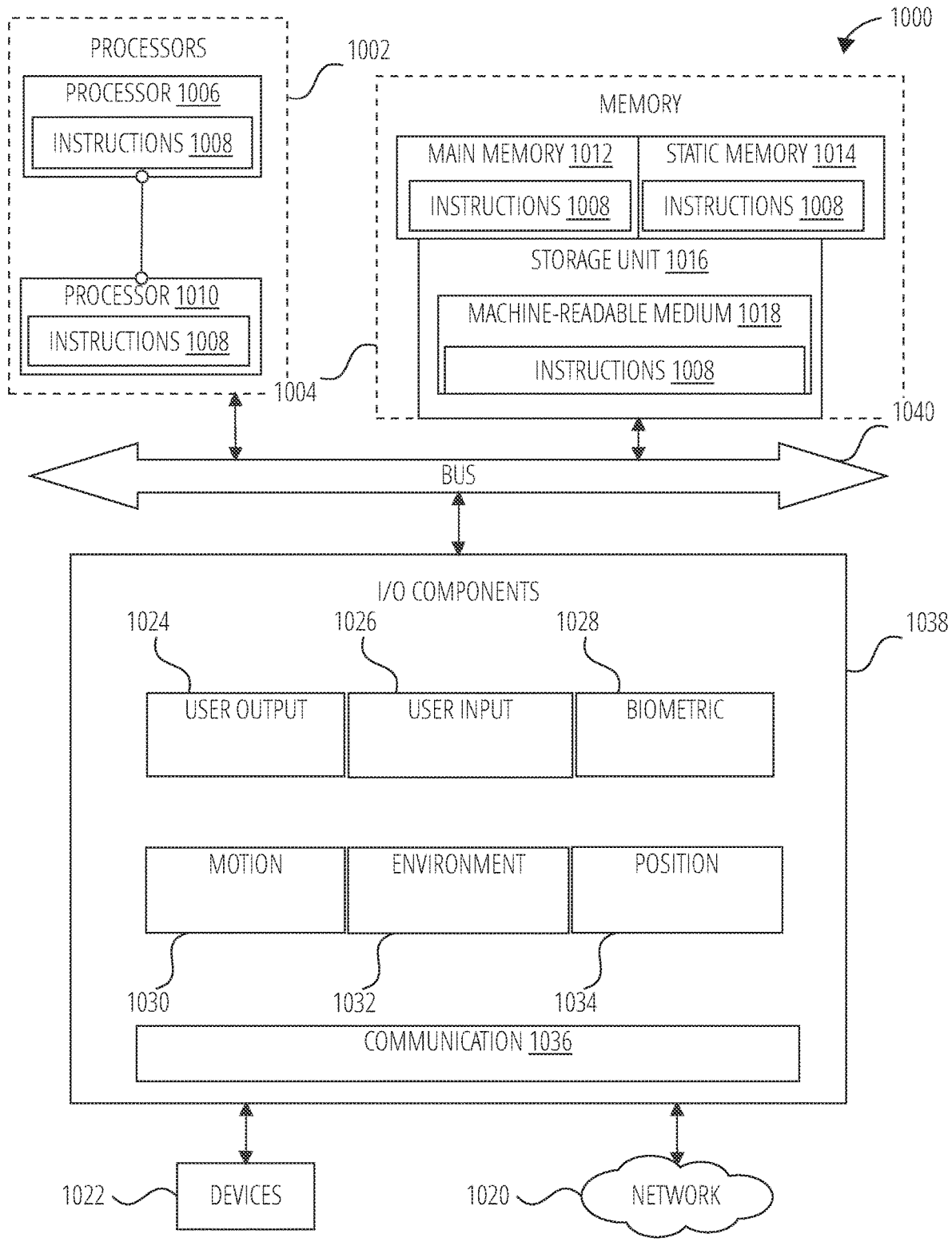
FIG. 10 is a diagrammatic representation of a machine in the form of a computer system within which a set of instructions may be executed for causing the machine to perform any one or more of the methodologies discussed herein, in accordance with some example embodiments.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1038, which may be configured to communicate with each other via a bus 1040. In an example embodiment, the processors 1002 (e.g., a Central Processing Unit (CPU), a Reduced :Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1006 and a Processor 1010 that execute the instructions 1008. The term "Processor" is intended to include multi-core processors that may comprise two or more independent processors (sometimes referred to as "cores") that may execute instructions contemporaneously. Although FIG. 10 shows multiple processors 1002, the machine 1000 may include a single Processor with a single core, a single Processor with multiple cores (e.g., a multi-core Processor), multiple processors with a single core, multiple processors with multiples cores, or any combination thereof.

The memory 1004 includes a main memory 1012, a static memory 1014, and a storage unit 1016, both accessible to the processors 1002 via the bus 1040. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various example embodiments, the I/O components 1038 may include user output components 1024 and user input components 1026. The user output components 1024 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument tactile input components (e.g., a physical button, a touch screen that provides location and/or force of touches or touch gestures, or other tactile input components), audio input components (e.g., a microphone), and the like.

In further example embodiments, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope). The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1034 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface Component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface Component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Figure 11:
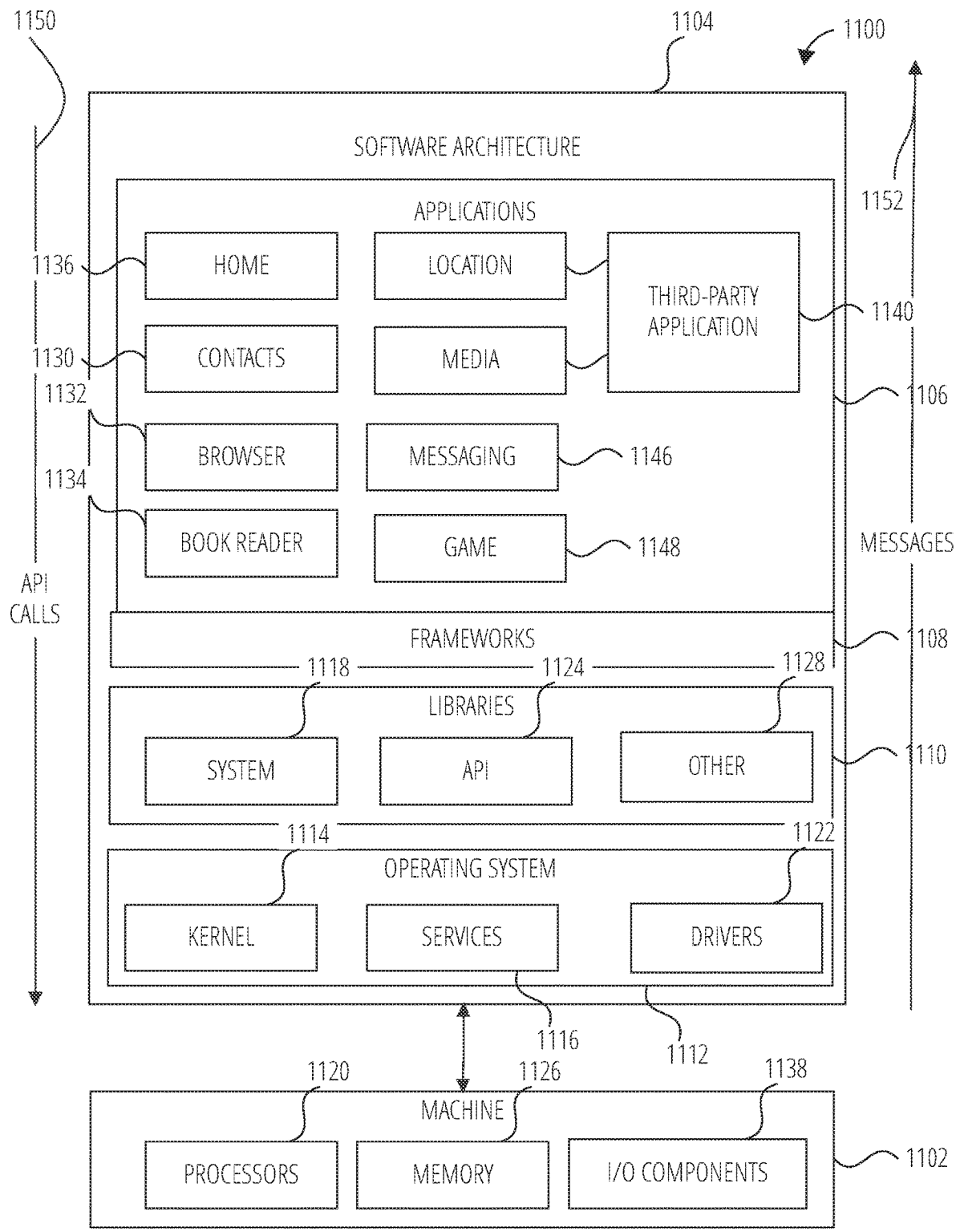
FIG. 11 is block diagram showing a software architecture within which the present disclosure may be implemented, according to an example embodiment.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, Processor management (e.g., scheduling), Component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example embodiment, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The e applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1140 can invoke the API calls 1150 provided by the operating system 1112 to facilitate functionality described herein.

What is claimed is:

1. A method comprising:
    receiving, by a processor, an observed motion data from a first device associated with a first user, the first device generating the observed motion data based on an analysis of a data stream, the first device includes a camera that captures the data stream comprising video images of a second user performing a gesture as captured by the first user, the second user being associated with and coupled to a second device;
    receiving from the second device a captured motion data that is recorded by a sensor included in the second device, wherein the sensor captures position, movement and orientation of the second device;
    determining whether there is a match between the observed motion data from the first device and the captured motion data from the second device, wherein determining there is the match is based on the observed motion data and the captured motion data describing a same gesture being performed by the second user within a predetermined error threshold, wherein the gesture comprises a natural movement of the second user comprising a walking gait; and
    in response to determining that there is the match,
    generating a shared AR session between the first device and the second device; and
    causing the shared AR session to be displayed by the first device and by the second device.

2. The method of claim 1, wherein the shared AR session comprises a real-time messaging session.

3. The method of claim 1, wherein the first device generating the observed motion data based on the analysis of the data stream further comprises:
    the first device identifying positions of at least one body part of the second user and analyzing a motion of the at least one body part during the gesture.

4. The method of claim 3, wherein the at least one body part includes an arm or hand of the second user.

5. The method of claim 1, wherein the data stream further comprises images of a third user being associated with a third device, and wherein the first device identifies the second user in the data stream as being associated with the second device.

6. A system comprising:
    a processor; and
    a memory having instructions stored thereon, when executed by the processor, causes the system to perform operations comprising:
    receiving an observed motion data from a first device associated with a first user, the first device generating the observed motion data based on an analysis of a data stream, the first device includes a camera that captures the data stream comprising video images of a second user performing a gesture as captured by the first user, the second user being associated with and coupled to a second device;
    receiving from the second device a captured motion data that is recorded by a sensor included in the second device, wherein the sensor captures position, movement and orientation of the second device;
    determining whether there is a match between the observed motion data from the first device and the captured motion data from the second device, wherein determining there is the match is based on the observed motion data and the captured motion data describing a same gesture being performed by the second user within a predetermined error threshold, wherein the gesture comprises a natural movement of the second user comprising a walking gait; and in response to determining that there is the match, generating a shared AR session between the first device and the second device; and causing the shared AR session to be displayed by the first device and by the second device.

7. The system of claim 6, wherein the shared AR session comprises a real-time messaging session.

8. The system of claim 6, wherein the first device generating the observed motion data based on the analysis of the data stream further comprises:

the first device identifying positions of at least one body part of the second user and analyzing a motion of the at least one body part during the gesture.

9. The system of claim 8, wherein the at least one body part includes an arm or hand of the second user.

10. The system of claim 6, wherein the data stream further comprises images of a third user being associated with a third device, and wherein the first device identifies the second user in the data stream as being associated with the second device.

11. A non-transitory computer-readable storage medium having stored thereon instructions, when executed by a processor, causes the processor to perform operations comprising:

receiving an observed motion data from a first device associated with a first user, the first device generating the observed motion data based on an analysis of a data stream, the first device includes a camera that captures the data stream comprising video images of a second user performing a gesture as captured by the first user, the second user being associated with and coupled to a second device;

receiving from the second device a captured motion data that is recorded by a sensor included in the second device, wherein the sensor captures position, movement and orientation of the second device;

determining whether there is a match between the observed motion data from the first device and the captured motion data from the second device, wherein determining there is the match is based on the observed motion data and the captured motion data describing a same gesture being performed by the second user within a predetermined error threshold, wherein the gesture comprises a natural movement of the second user comprising a walking gait; and in response to determining that there is the match, generating a shared AR session between the first device and the second device; and causing the shared AR session to be displayed by the first device and by the second device.

12. A method comprising:

capturing, using a camera included in a first device, a video of a user of a second device performing a gesture as captured by a first user of the first device, wherein the user of the second device is coupled to the second device;

generating, by a processor included in the first device, an observed motion data based on an analysis of the video of the user of the second device;

receiving, by the first device from the second device, a captured motion data that is recorded by a sensor included in the second device, wherein the sensor captures position, movement and orientation of the second device;

determining, by the first device, whether there is a match between the observed motion data and the captured motion data from the second device, wherein determining there is the match is based on the observed motion data and the captured motion data describing a same gesture being performed by the user of the second device within a predetermined error threshold, wherein the gesture comprises a natural movement of the second user comprising a walking gait; and in response to determining that there is the match, transmitting a request to a server to generate a shared AR session between the first device and the second device.

13. The method of claim 12, further comprising:

in response to determining that there is the match, transmitting the request to the server to cause the shared AR session to be displayed by the first device and by the second device.

14. The method of claim 12, wherein a shared AR session is established between the first device and the second device.

15. The method of claim 14, further comprising:

in response to determining that there is the match, identifying by the first device, the user of the second device in the video as being associated with the second device.

16. The method of claim 12, wherein the shared AR session comprises a real-time messaging session.

17. The method of claim 12, wherein generating by the first device the observed motion data further comprises:

identifying positions of at least one body part of the user of the second device and analyzing a motion of the at least one body part during the gesture.

18. The method of claim 17, wherein the at least one body part includes an arm or hand of the user of the second device.

* * * * *